United States Patent
Furuhashi

(10) Patent No.: US 10,438,372 B2
(45) Date of Patent: Oct. 8, 2019

(54) ARITHMETIC METHOD, IMAGING APPARATUS, AND STORAGE MEDIUM

(71) Applicant: OLYMPUS CORPORATION, Hachioji-shi, Tokyo (JP)

(72) Inventor: Yukihito Furuhashi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 54 days.

(21) Appl. No.: 15/827,572

(22) Filed: Nov. 30, 2017

(65) Prior Publication Data
US 2018/0082437 A1 Mar. 22, 2018

Related U.S. Application Data

(63) Continuation of application No. PCT/JP2015/067268, filed on Jun. 16, 2015.

(51) Int. Cl.
*G06T 7/73* (2017.01)
*G06T 7/136* (2017.01)
*G06T 7/11* (2017.01)

(52) U.S. Cl.
CPC .............. *G06T 7/73* (2017.01); *G06T 7/11* (2017.01); *G06T 7/136* (2017.01); *G06T 2207/20* (2013.01)

(58) Field of Classification Search
CPC ......... G06T 7/11; G06T 7/73; G06T 2207/20; G06T 7/136; H04N 5/23212; H04N 5/23219; H04N 5/23209; H04N 5/232933
See application file for complete search history.

(56) References Cited

U.S. PATENT DOCUMENTS

| 2009/0244357 A1* | 10/2009 | Huang | H04N 5/23212 |
| | | | 348/345 |
| 2012/0254369 A1* | 10/2012 | Gillard | H04N 21/25891 |
| | | | 709/219 |
| 2013/0235069 A1* | 9/2013 | Ubillos | G09G 5/026 |
| | | | 345/594 |

(Continued)

FOREIGN PATENT DOCUMENTS

| CN | 101547313 A | 9/2009 |
| JP | 05225317 A | 9/1993 |
| JP | 4625356 B2 | 2/2011 |

OTHER PUBLICATIONS

Chinese Office Action (and English language translation thereof) dated Jan. 11, 2019 issued in counterpart Chinese Application No. 201580080941.3.

(Continued)

*Primary Examiner* — Shaghayegh Azima
(74) *Attorney, Agent, or Firm* — Holtz, Holtz & Volek PC

(57) ABSTRACT

According to an embodiment, an arithmetic method includes accepting an input of image data, detecting a representative position of a characteristic portion from the image data the input of which has been accepted, acquiring a user instructed position in the image data, calculating a position difference indicating a difference between the detected representative position and the acquired user instructed position, and selecting the representative position of the characteristic portion as a target portion if the calculated position difference is smaller than a predetermined first threshold and selecting the user instructed position as a target portion if the position difference is not smaller than the first threshold.

7 Claims, 9 Drawing Sheets

| | | Depth difference | |
|---|---|---|---|
| | | Smaller than threshold | Equal to or larger than threshold |
| Position difference | Smaller than threshold | Representative position of characteristic portion | User instructed position |
| | Equal to or larger than threshold | User instructed position | User instructed position |

(56) References Cited

U.S. PATENT DOCUMENTS

2016/0065832 A1* 3/2016 Kim .................. H04N 5/23212
348/207.11

OTHER PUBLICATIONS

International Search Report (ISR) and Written Opinion dated Jul. 28, 2015 issued in International Application No. PCT/JP2015/067268.
English translation of the International Preliminary Report on Patentability dated Dec. 28, 2017 issued in counterpart International Application No. PCT/JP2015/067268.
Japanese Office Action dated Jul. 23, 2019 (and English translation thereof) issued in Japanese Application No. 2017-524172.

* cited by examiner

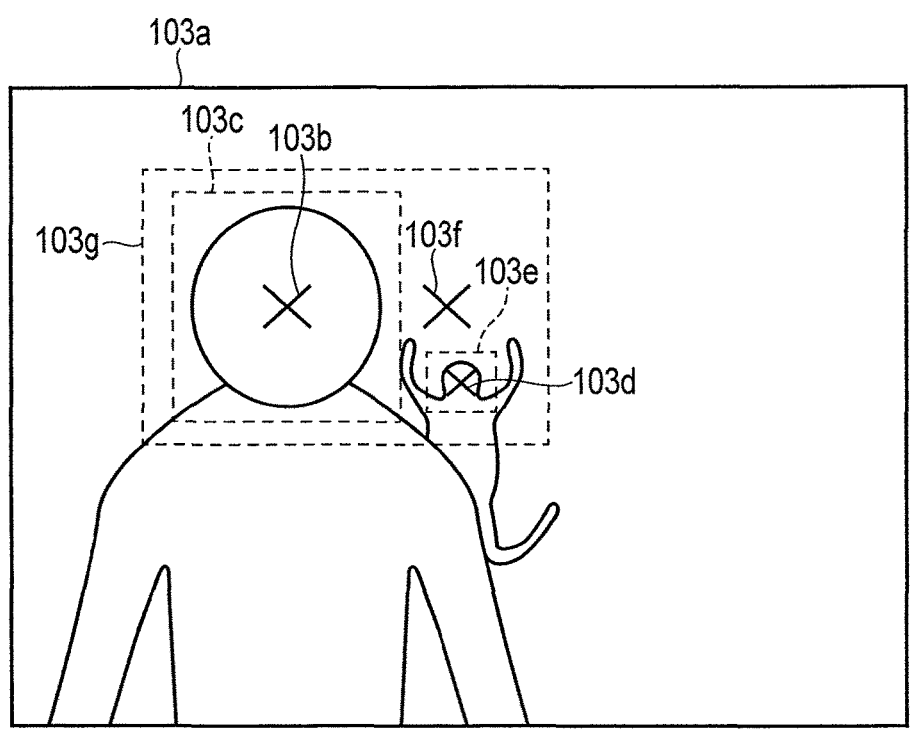
F I G. 5

|  | Depth difference | |
|---|---|---|
|  | Smaller than threshold | Equal to or larger than threshold |
| Position difference — Smaller than threshold | Representative position of characteristic portion | User instructed position |
| Position difference — Equal to or larger than threshold | User instructed position | User instructed position |

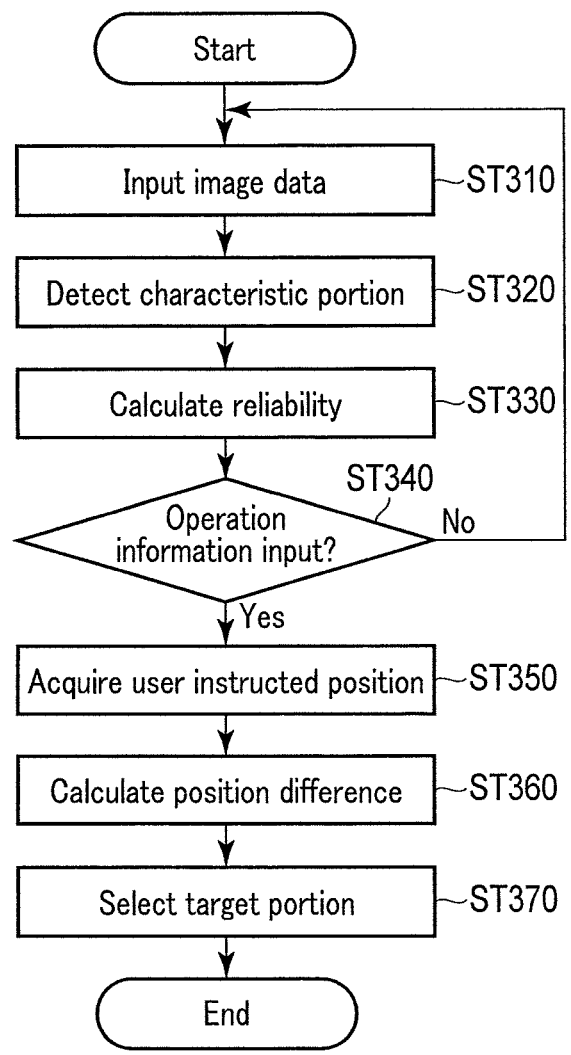
F I G. 12

ARITHMETIC METHOD, IMAGING APPARATUS, AND STORAGE MEDIUM

CROSS-REFERENCE TO RELATED APPLICATIONS

This application is a Continuation Application of PCT Application No. PCT/JP2015/067268, filed Jun. 16, 2015, the entire contents of which are incorporated herein by reference.

BACKGROUND OF THE INVENTION

1. Field of the Invention

The present invention relates to an arithmetic method, an imaging apparatus, and a storage medium.

2. Description of the Related Art

In order to perform post processing intended by a user on image data, there is known a method of automatically detecting a part to receive attention in the image data. For example, Japanese Patent No. 4625356 proposes a technique of selecting, as a target portion, the position of a characteristic portion detected by an image processing apparatus from image data and trimming the image data based on the target portion. In the technique of Japanese Patent No. 4625356, the image processing apparatus selects the target portion by detecting, as a characteristic portion, at least one of a part representing a human face, an in-focus part, and a part representing at least one of a horizontal line and a vertical line.

On the other hand, including a smartphone, an imaging apparatus having touch AF (Auto Focus) and touch shutter functions can easily instruct a position to which a user wants to pay attention.

BRIEF SUMMARY OF THE INVENTION

In general, according to an aspect of embodiments, an arithmetic method includes accepting an input of image data, detecting a representative position of a characteristic portion from the image data the input of which has been accepted, acquiring a user instructed position in the image data, calculating a position difference indicating a difference between the detected representative position and the acquired user instructed position, and selecting the representative position of the characteristic portion as a target portion if the calculated position difference is smaller than a predetermined first threshold and selecting the user instructed position as a target portion if the position difference is not smaller than the first threshold.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5 is a schematic view showing an example of image data according to the first embodiment;

FIG. 12 is a flowchart showing an example of the operation of the arithmetic device according to the third embodiment.

DETAILED DESCRIPTION OF THE INVENTION

Embodiments related to the present invention will be described below with reference to the accompanying drawings. Note that an arithmetic device below may be implemented by using a program for causing a, computer to function as an arithmetic device that selects a target portion from image data. That is, the arithmetic device may implement the function of a function block by a hardware resource such as a memory or a CPU (Central Processing Unit) and a software program that cooperates with the hardware resource.

[First Embodiment]

Figure 1:
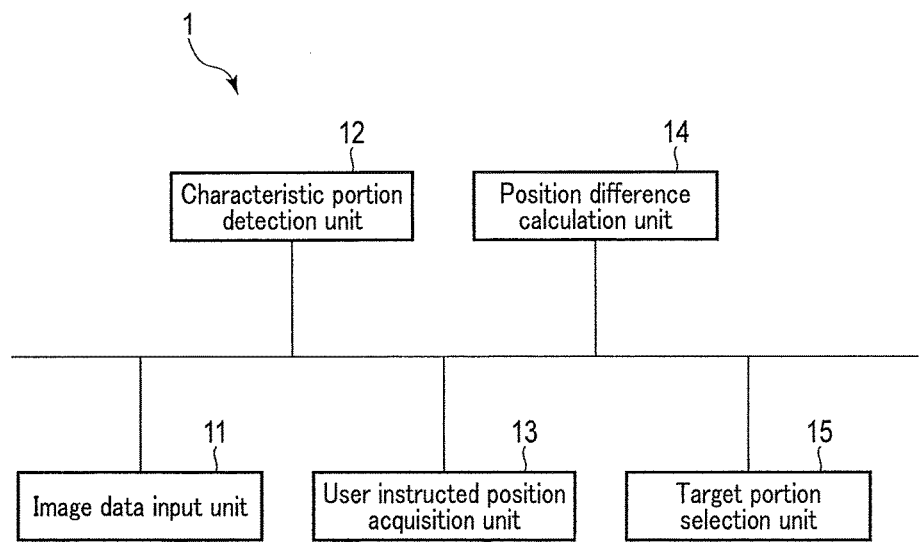
FIG. 1 is a block diagram showing an example of the functional arrangement of an arithmetic device according to a first embodiment of the present invention.

FIG. 1 is a block diagram showing an example of the functional arrangement of an arithmetic device according to the first embodiment of the present invention. An arithmetic device 1 has a function of doing arithmetic operation using the characteristic of image data in order to perform post processing that reflects a user intention. More specifically, the arithmetic device 1 has a function of selecting, as a target portion, one of a user instructed position instructed by a user and a representative position of a characteristic portion which is detected for input image data. Note that post processing includes, for example, AF, trimming, or the like related to the selected target portion. The arithmetic device 1 shown in FIG. 1 includes an image data input unit 11, a characteristic portion detection unit 12, a user instructed position acquisition unit 13, a position difference calculation unit 14, and a target portion selection unit 15.

The image data input unit 11 accepts the input of image data. The image data input unit 11 transmits, to the characteristic portion detection unit 12, the image data the input of which has been accepted. Note that as the image data input to the image data input unit 11, image data captured by an imaging unit (not shown) may be input directly or via a storage medium or the like. The image data is not limited to the image data captured by the imaging unit and may be image data of CG (Computer Graphics) or the like. The image data input unit 11 may receive image data by wired communication or wireless communication.

The characteristic portion detection unit 12 receives the image data from the image data input unit 11 and makes an analysis for calculating a characteristic amount in the image data. Based on the characteristic amount calculated as a result of the analysis, the characteristic portion detection unit 12 detects the representative position of the characteristic portion from the image data. The representative position of the characteristic portion is detected as, for example, coordinates corresponding to the arrangement of the image data distributed two-dimensionally. The characteristic portion detection unit 12 transmits information on the detected representative position of the characteristic portion of the image data to the position difference calculation unit 14 and target portion selection unit 15.

Note that indices such as the change amounts of saturation and luminance or the height of a spatial frequency are applicable to the characteristic amount in the image data. The characteristic portion detected by the characteristic amount may be a portion having a name as an object such as a part of a human body, a pet, a flower, a dish, a blue sky, or a cloud. The characteristic portion detected by the characteristic amount is not limited to the portion having the name as the object, and the characteristic portion may be a part the indices of which are high or low, and that does not have the name as the object.

Note that the characteristic portion detected by the characteristic portion detection unit 12 may further include a region in addition to the representative position. The region of the characteristic portion can be detected as an arbitrary shape of, for example, a region in which the calculated characteristic amount exceeds a predetermined threshold or a rectangular region that includes at least the region in which the characteristic amount exceeds the threshold. As the representative position of the characteristic portion having the region, the position of a pixel having the maximum characteristic amount in the region, the center of the region, or the like can be set. However, the present invention is not limited to this, and an arbitrary position in the region can be set as the representative position. If the characteristic portion includes the region, the characteristic portion detection position 12 transmits information on the representative position and region to the target portion selection unit 15.

In accordance with the result of the analysis made on the image data, the characteristic portion detection unit 12 may detect the respective representative positions of a plurality of characteristic portions. In this case, the characteristic portion detection unit 12 may identify the plurality of characteristic portions as a plurality of characteristic portions independent of each other. Alternatively, the characteristic portion detection unit 12 may identify the plurality of characteristic portions as one characteristic portion by grouping them on the basis of a characteristic type. The characteristic portion detection unit 12 transmits, to the position difference calculation unit 14, information on the detected respective representative positions in the plurality of characteristic portions and transmits, to the target portion selection unit 15, information on the detected respective representative positions in the plurality of characteristic portions and regions.

Note that as the representative position of the grouped characteristic portions, the center of the group, the barycenter of the representative position of each characteristic portion, or the barycenter of each representative position when it is weighted by the area of the region in a corresponding one of the characteristic portions can be set. The characteristic portion detection unit 12 may receive a user instructed position of image data to be described later from the user instructed position acquisition unit 13 and set the representative position of each characteristic portion by using the user instructed position. That is, the characteristic portion detection unit 12 can set, as the representative position of the grouped characteristic portions, the representative position of a characteristic portion closest to the user instructed position or the barycenter of each representative position when it is weighted by a position difference indicating a difference between the user instructed position and the representative position of each characteristic portion (to be referred to as a "position difference" hereinafter).

Based on operation information input by a user operation, the user instructed position acquisition unit 13 acquires the user instructed position of the image data. Note that an example of the user instructed position includes an in-focus instruction position of a position where a focus is adjusted, an image processing instruction position of a position where image processing is executed, or the like. The user instructed position acquisition unit 13 acquires the operation information by, for example, the touch operation of the user on a screen where the image data is displayed. Based on the acquired operation information, the user instructed position acquisition unit 13 acquires the coordinate of the touched position on the image data as the user instructed position. Note that the user instructed position acquisition unit 13 can acquire the operation information not only by a method of touching on the screen but also by an arbitrary method such as a method of moving, by the user, a cursor displayed on the screen or a method of inputting the coordinate directly. The user instructed position acquisition unit 13 transmits information on the acquired user instructed position to the characteristic portion detection unit 12, the position difference calculation unit 14, and the target portion selection unit 15.

The position difference calculation unit 14 receives the information on the representative position of each characteristic portion from the characteristic portion detection unit 12 and receives the information on the user instructed position from the user instructed position acquisition unit 13. The position difference calculation unit 14 calculates a position difference between the user instructed position and the representative position of each characteristic portion, and transmits information on the position difference to the target portion selection unit 15. The position difference is calculated as, for example, the value of a distance on the coordinate between the user instructed position and the representative position of the characteristic portion, the number of pixels that exists between the user instructed position and the representative position of the characteristic portion, or the like. The position difference calculation unit 14 also calculates position differences at the respective representative positions and transmits them to the target portion selection unit 15 when the position difference calculation unit 14 receives information on the respective representative positions of the plurality of characteristic portions from the characteristic portion detection unit 12.

The target portion selection unit 15 receives the information on the representative position of each characteristic portion from the characteristic portion detection unit 12 and receives the information on the user instructed position from the user instructed position acquisition unit 13. The target portion selection unit 15 also receives position difference information from the position difference calculation unit 14 and selects a target portion based on the received position difference. The target portion selection unit 15 selects the representative position of characteristic portion as a target portion if the position difference is smaller than a predetermined threshold (to be referred to as the "first threshold" hereinafter) and selects the user instructed position as a target portion if the position difference is equal to or larger than the first threshold.

Note that the target portion is a portion used as a reference when post processing is executed on image data. More specifically, post processing includes a photographing operation and image processing. Note that an example of the photographing operation includes the operation of AF, AE (Auto Exposure) or the like. In post processing of such a photographing operation, the target portion is defined by position information. Examples of image processing include various processes such as trimming, white balance correction, and special effects of frame, art filter, art effect, and the like. In post processing of such special effects, the target portion is preferably defined by region information in addition to the position information. That is, the target portion may be defined, in accordance with post processing to be executed, not only by a position to receive attention as described above but also by a position and region to receive attention.

The target portion selection unit 15 may further receive information on the region of characteristic portion and define the value of the first threshold based on the size of the region. That is, the target portion selection unit 15 sets the first threshold large if the size of the region is large and sets the first threshold small if the size of the region is small. In this case, the first threshold is not limited to a fixed value and may be calculated based on a function that has a numerical value representing the region of characteristic portion as a parameter. More specifically, the first threshold may be a value obtained by multiplying the numerical value representing the region of characteristic portion by a predetermined coefficient (for example, 1.2). For example, the diameter of a circle including the region of characteristic portion, the length of a side of a rectangle including the region, the area of the region, or the like is applicable to the numerical value representing the region as needed.

If the target portion selection unit 15 receives information on a plurality of position differences, it selects a target portion based on the plurality of position differences. If all the received position differences are equal to or larger than the first threshold, the target portion selection unit 15 determines the user instructed position as a target portion. If one or more characteristic portions in which each position difference becomes smaller than the first threshold exists, the target portion selection unit 15 extracts the one or more characteristic portions. If the target portion selection unit 15 extracts one characteristic portion, it selects the representative position of the characteristic portion as a target portion. If the target portion selection unit 15 extracts some characteristic portion, the target portion selection unit 15 selects, as a target portion, the representative position of a characteristic portion having the smallest position difference. Note that if there exist the plurality of extracted characteristic portions, the target portion selection unit 15 may select, as a target portion, a representative position in a case in which the plurality of characteristic portions are set as one group. In this case, the region of the selected target portion may include the respective representative positions or respective regions of the plurality of grouped characteristic portions.

Note that if the target portion selection unit 15 receives the information on the plurality of position differences, it may select a plurality of target portions. More specifically, if the target portion selection unit 15 extracts the plurality of characteristic portions each having the position difference smaller than the first threshold, it selects the respective representative positions of the plurality of characteristic portions as the target portions. In this case, the region of each of the selected target portions may be the region of a characteristic portion corresponding to the representative position selected as the target portion or may be a region including the plurality of extracted characteristic portions.

Figure 2:
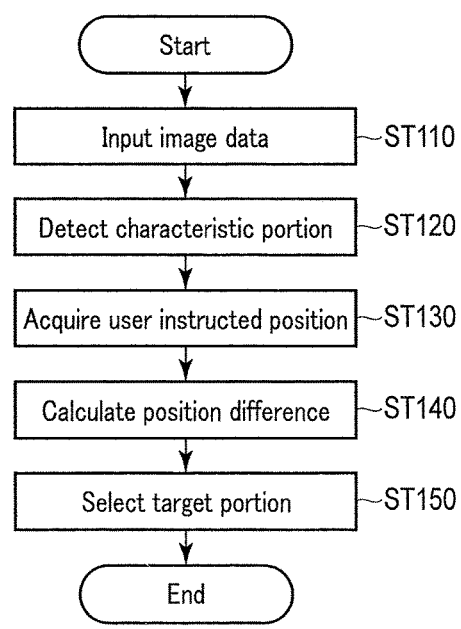
FIG. 2 is a flowchart showing an example of the operation of the arithmetic device according to the first embodiment.

An example of the concrete operation of the arithmetic device of the first embodiment as described above will now be described with reference to a flowchart shown in FIG. 2.

First, in step ST110, the image data input unit 11 accepts the input of image data and transmits, to the characteristic portion detection unit 12, the image data the input of which has been accepted.

In step ST120, the characteristic portion detection unit 12 makes an analysis on the received image data and detects the representative position of a characteristic portion. The characteristic portion detection unit 12 transmits information on the detected representative position of the characteristic portion to the position difference calculation unit 14 and target portion selection unit 15.

In step ST130, based on user operation information, the user instructed position acquisition unit 13 acquires a user instructed position in the image data. The user instructed position acquisition unit 13 transmits the acquired user instructed position to the position difference calculation unit 14 and target portion selection unit 15.

In step ST140, the position difference calculation unit 14 calculates a position difference between the received representative position of the characteristic portion and user instructed position. The position difference calculation unit 14 transmits information on the calculated position difference to the target portion selection unit 15.

In step ST150, the target portion selection unit 15 selects a target portion based on the received position difference. More specifically, the target portion selection unit 15 determines whether the position difference is smaller than the first threshold. The target portion selection unit 15 selects the representative position of the characteristic portion as a target portion if it determines that the position difference is smaller than the first threshold and selects the user instructed position as a target portion if it determines that the position difference is not smaller than the first threshold.

As described above, in the first embodiment, the position difference calculation unit 14 calculates a position difference between the representative position of the characteristic portion detected by the characteristic portion detection unit 12 and the user instructed position acquired by the user instructed position acquisition unit 13. The target portion selection unit 15 selects the target portion based on the calculated position difference. Alternatively, the target portion selection unit 15 determines whether the position difference is smaller than the predetermined first threshold, selects the representative position of the characteristic portion as the target portion if the position difference is smaller than the first threshold, and selects the user instructed position as the target portion if the position difference is not smaller than the first threshold. This makes it possible to determine which to select, as the target portion, between the user instructed position instructed by the user and the representative position of the characteristic portion near the user instructed position.

For example, the user instructs the user instructed position by touching a screen or the like with the intention of instructing a face in image data. In this case, the user instructed position acquisition unit 13 often acquires, as the user instructed position, a part other than the face such as a body or the position of a background region on the periphery of the face detected as a characteristic portion. However, the arithmetic device 1 can select the face as the target portion by evaluating that a position difference between the representative position of the face and the user instructed position is smaller than the first threshold.

In another example, the user instructs, as a user instructed position, a building located away from the face with the intention of instructing a location other than the face. In this case, the arithmetic device 1 can select the building as a target portion by evaluating that the position difference between the representative position of the face and the user instructed position is equal to or larger than the first threshold.

Therefore, the arithmetic device 1 can select the target portion intended by the user and execute post processing that conforms to the user intention. For example, if trimming is performed as the example of post processing, an image after trimming can include an object that matches a user intention. If AF is performed as post processing, it is possible to decide a position that matches the user intention as an in-focus position and perform photographing in an in-focus state. This makes it possible, when a position shifted slightly from a position to receive attention is touched, to avoid the touched position from being focused. It is therefore possible to avoid image acquisition of an out-of-focus picture owing to a slight shift in touch.

Some modifications of operations according to the first embodiment will now be described.

(First Modification)

Figure 3:
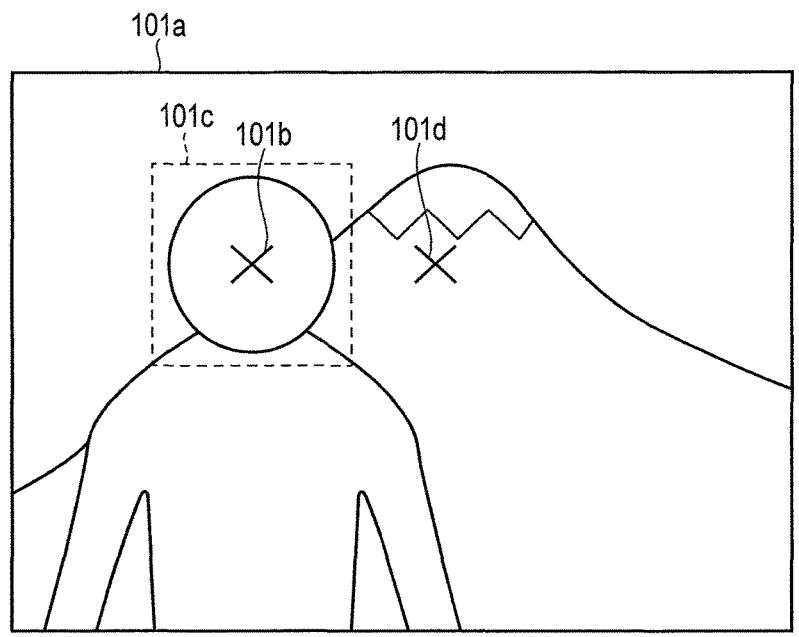
FIG. 3 is a schematic view showing an example of image data according to the first embodiment.
Figure 4:
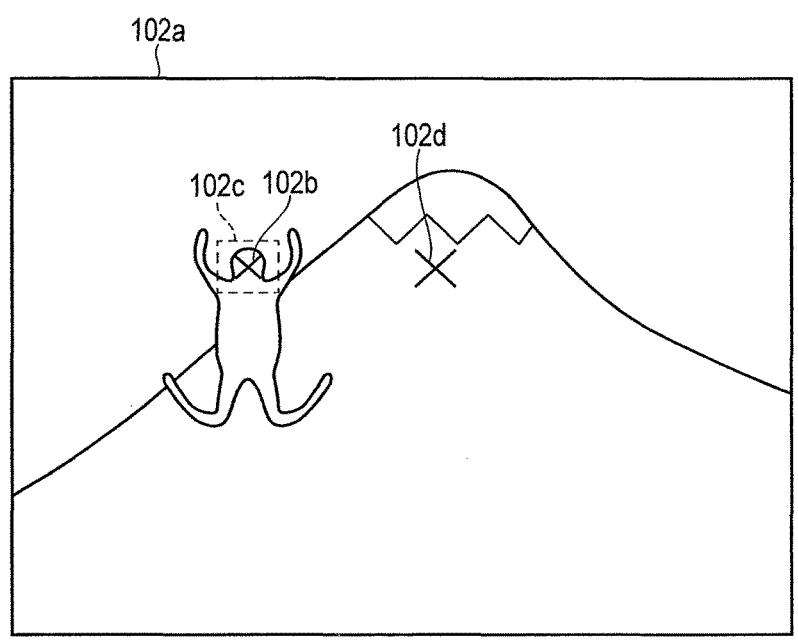
FIG. 4 is a schematic view showing an example of image data according to the first embodiment.

First, the operation of the first modification when a characteristic portion includes a region will be described assuming that image data 101a shown in FIG. 3 and image data 102a shown in FIG. 4 are input. The target portion selection unit 15 selects the representative position of the characteristic portion as a target portion for the image data 101a and selects a user instructed position as a target portion for the image data 102a. Note that the image data 101a and 102a have the same screen size.

In step ST110, the image data input unit 11 accepts the inputs of the image data 101a and 102a. Note that the image data 101a and 102a are the same in composition in which each of them includes a person as an object and a background, but are different in that the object in the image data 101a is captured larger than the object in the image data 102a.

In step ST120, the characteristic portion detection unit 12 detects the characteristic portion of each of the image data 101a and 102a. In each of the image data 101a and 102a, the characteristic portion detection unit 12 detects, as the representative position of the characteristic portion, the center of the face of the person as the object. Note that both a representative position 101b of the image data 101a and a representative position 102b of the image data 102a are detected at the identical positions on screens.

The characteristic portion detection unit 12 further detects, as the region of a characteristic portion, a rectangular region including a person's face. Note that a face region 101c of the image data 101a larger than, a face region 102c of the image data 102a is detected.

In step ST130, the user instructed position acquisition unit 13 acquires a user instructed position in each of the image data 101a and 102a. In each of the image data 101a and 102a, the user instructed position acquisition unit 13 acquires a part of the background as the user instructed position. Note that both a user instructed position 101d of the image data 101a and a user instructed position 102d of the image data 102a are at the identical positions on the screens.

In step ST140, the position difference calculation unit 14 calculates a position difference in each of the image data 101a and 102a. As described above, a position relationship between the user instructed position 101d and the representative position 101b of the characteristic portion in the image data 101a, and a position relationship between the user instructed position 102d and the representative position 102b of the characteristic portion in the image data 102a are the same. Therefore, the position difference calculation unit 14 calculates a position difference having the same value for each of the image data 101a and 102a.

In step ST150, the target portion selection unit 15 selects a target portion. Based on the size of a region of the person's face as the characteristic portion detected in each of the image data 101a and 102a, the target portion selection unit 15 determines the first threshold to be applied to each of the image data 101a and 102a. Note that the face region 101c of the image data 101a is larger than the face region 102c of the image data 102a. Accordingly, a value to be set to the first threshold set for the image data 101a is larger than that for the image data 102a. As a result, the first threshold set for the image data 101a becomes larger than the position difference, and the first threshold set for the image data 102a becomes smaller than the position difference. Thus, the target portion selection unit 15 selects, as the target portion, the face as the representative position of the characteristic portion for the image data 101a and selects, as the target portion, the background as the user instructed position for the image data 102a.

As described above, in the first modification, the characteristic portion detection unit 12 further includes detecting the regions of the characteristic portions. The target portion selection unit 15 determines the first threshold based on the size of the region of each of the characteristic portions. This allows the target portion selection unit 15 to, based on the size of the region of each characteristic portion, interpret the intention of the user instructed position by the user more reasonably and select a part to receive attention.

(Second Modification)

Next, the operation of the second modification when the respective representative positions of a plurality of characteristic portions are detected will be described assuming that image data 103a shown in FIG. 5 is input. Note that the target portion selection unit 15 selects, as target portions, the respective representative positions of the plurality of characteristic portions.

In step ST110, the image data input unit 11 accepts the input of the image data 103a. Note that the image data 103a includes two persons as objects, and the respective persons are captured close to and overlapping with each other on a screen.

In step ST120, the characteristic portion detection unit 12 detects the representative positions of characteristic portions for the image data 103a. The characteristic portion detection unit 12 detects, as representative positions 103b and 103d of the characteristic portions, respectively, the centers of faces of two persons as the objects in the image data 103a. The characteristic portion detection unit 12 further detects regions 103c and 103e of two characteristic portions including the faces of the respective persons.

In step ST130, the user instructed position acquisition unit 13 acquires a user instructed position in the image data 103a. The user instructed position acquisition unit 13 acquires, as a user instructed position 103f, a position closest to both the persons in the image data 103a.

In step ST140, the position difference calculation unit 14 calculates a position difference in the image data 103a. As described above, position relationships between a user instructed position 103f, and the representative positions 103b and 103d of two characteristic portions in the image data 103a are very close. Therefore, values smaller than the first threshold are calculated for each of two position differences.

In step ST150, the target portion selection unit 15 selects target portions. Note that two calculated position differences are both small. Therefore, the target portion selection unit 15 selects, as target portions, the representative positions 103b and 103d of two characteristic portions for the image data 103a. The target portion selection unit 15 may set, as regions of the respective target portions, the regions 103c and 103e of the respective characteristic portions selected as the target portions. The target portion selection unit 15 may set, as a region of the target portions, a region 103g that includes the respective regions 103c and 103e.

As described above, in the second modification, the characteristic portion detection unit 12 detects the respective representative positions of the plurality of characteristic portions. The target portion selection unit 15 selects a plurality of target portions based on the position differences between the user instructed position and the respective representative positions. This allows the target portion selection unit 15 to execute post processing that further conforms to the user intention by using, when the characteristic portions form a group, all the characteristic portions in the group as the target portions. For example, if trimming is performed as post processing, it is possible to generate, from one image data, a plurality of trimming images having different target portions. This allows the user to acquire an image that matches a user intention from the trimming images in a wide range of variations. If AF is performed as post processing, focus bracketing can be performed on the plurality of target portions from one image data. This allows the target portion selection unit 15 to provide a plurality of images that include images intended by the user while excluding parts unintended by the user from the target portions.

[Second Embodiment]

Figure 6:
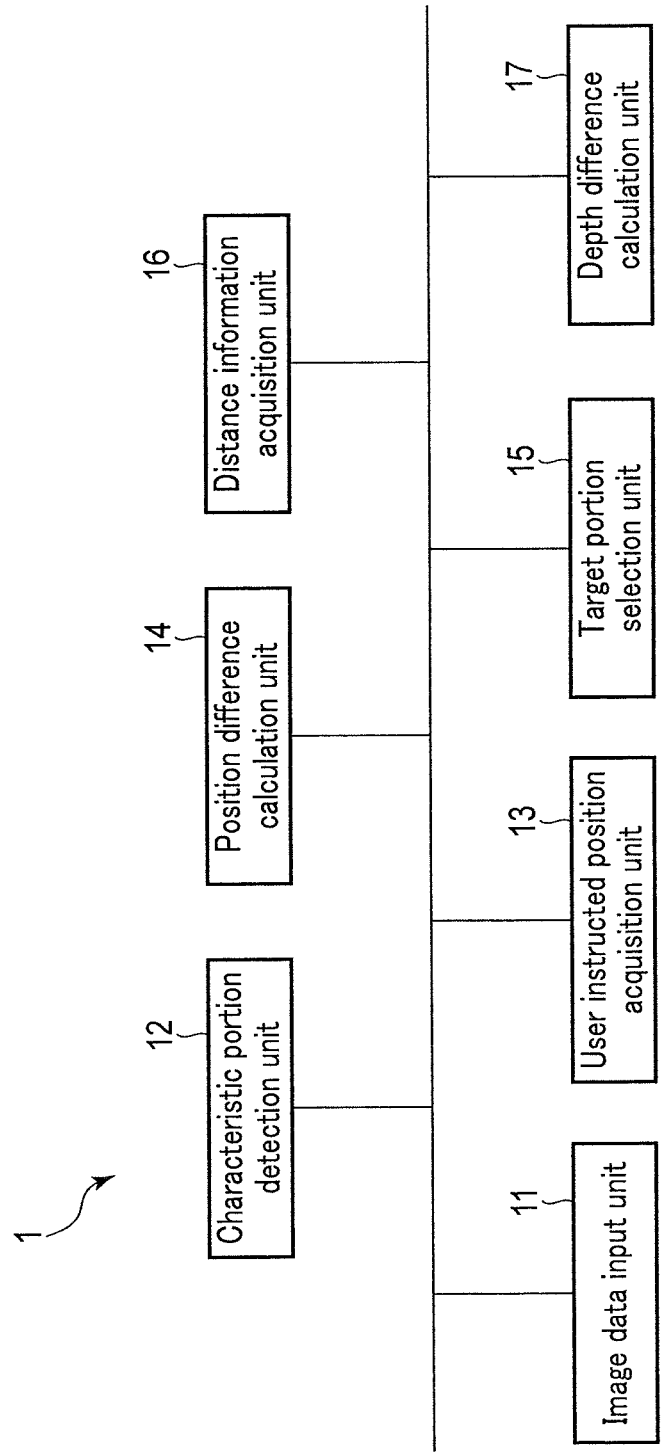
FIG. 6 is a block diagram showing an example of the functional arrangement of an arithmetic device according to a second embodiment of the present invention.

FIG. 6 is a block diagram showing an example of the functional arrangement of an arithmetic device according to the second embodiment of the present invention. As compared with the first embodiment, the second embodiment has an arrangement capable of selecting a target portion in image data which is more intended by a user by further considering information on a distance from an imaging apparatus to an object. More specifically, an arithmetic device 1 shown in FIG. 6 further includes a distance information acquisition unit 16 and a depth difference calculation unit 17. The same reference numerals denote the same parts as in FIG. 1, omitting a detailed description thereof and mainly describing different parts below.

A characteristic portion detection unit 12 transmits the detected representative position of a characteristic portion to the distance information acquisition unit 16. When the characteristic portion detection unit 12 detects the respective representative positions of a plurality of characteristic portions, it transmits the representative positions of the plurality of characteristic portions to the distance information acquisition unit 16. A user instructed position acquisition unit 13 transmits an acquired user instructed position to the distance information acquisition unit 16.

The distance information acquisition unit 16 acquires distance information indicating a distance between an imaging apparatus that captures image data input to an image data input unit 11 and an object in the image data. More specifically, the distance information acquisition unit 16 receives the representative position of the characteristic portion in the image data from the characteristic portion detection unit 12 and receives a user instructed position in the image data from the user instructed position acquisition unit 13. The distance information acquisition unit 16 acquires distance information indicating a distance between the imaging apparatus and the object corresponding to the representative position of the characteristic portion (to be referred to as the "first distance information" hereinafter), and distance information indicating a distance between the imaging apparatus and the object corresponding to the user instructed position (to be referred to as the "second distance information" hereinafter). If the representative positions of the plurality of characteristic portions are received from the characteristic portion detection unit 12, the distance information acquisition unit 16 acquires a plurality of pieces of the first distance information for the representative positions of the plurality of characteristic portions. The distance information acquisition unit 16 transmits the acquired distance information to the depth difference calculation unit 17.

Note that the distance information acquisition unit 16 may acquire distance information when a numerical value or the like is input by an operation by the user. Alternatively, the distance information acquisition unit 16 may acquire distance information indicating a distance between an imaging unit and the object from the imaging unit. For example, the distance information acquisition unit 16 may acquire, from the imaging unit, the distance information together with information regarding the depth of an entire imaging range by a method such as a phase difference AF, DFD (Depth from Defocus), or light field. Alternatively, the distance information acquisition unit may acquire the distance information from the imaging unit by adopting an arrangement for using an output from another sensor such as a laser sensor (not shown).

The depth difference calculation unit 17 receives the first distance information and the second distance information from the distance information acquisition unit 16. Based on the first distance information and the second distance information, the depth difference calculation unit 17 calculates a difference between a distance from the imaging apparatus to the object corresponding to the representative position of the characteristic portion and a distance from the imaging apparatus to the object corresponding to the user instructed position (to be referred to as a "depth difference" hereinafter). The depth difference calculation unit 17 transmits information on the calculated depth difference to a target portion selection unit 15. If the distance information of the respective representative positions of the plurality of characteristic portions is received from the distance information acquisition unit 16, the depth difference calculation unit 17 calculates a depth difference for the respective representative positions of the characteristic portions and transmits it to the target portion selection unit 15.

Figures 7, 8:
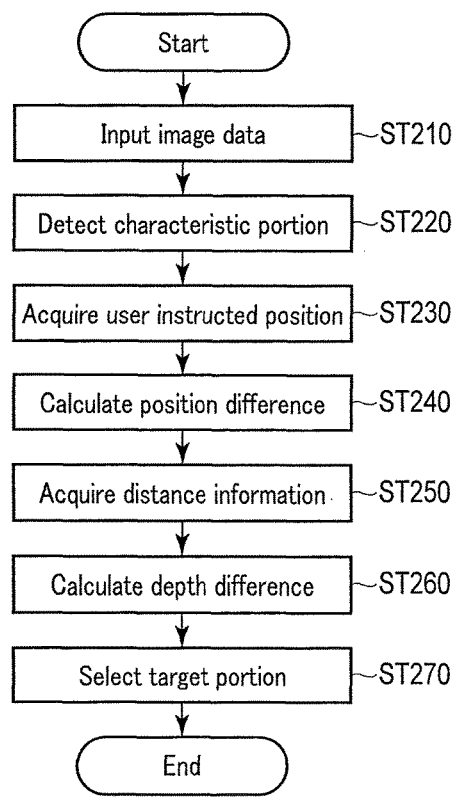
FIG. 7 is a table schematically showing an example of target portion selection logic according to the second embodiment.
FIG. 8 is a flowchart showing an example of the operation of the arithmetic device according to the second embodiment.

The target portion selection unit 15 receives information on the depth difference from the depth difference calculation unit 17. The target portion selection unit 15 selects a target portion based on the depth difference and the position difference. FIG. 7 is a table schematically showing an example of target portion selection logic based on the position difference and depth difference by the target portion selection unit 15. In the example of FIG. 7, the target portion selection unit 15 selects the representative position of the characteristic portion as a target portion if the position difference is smaller than the first threshold, and the depth difference is smaller than a predetermined threshold (to be referred to as the "second threshold" hereinafter). The target portion selection unit 15 selects the user instructed position as a target portion if the position difference is not smaller than the first threshold, or the depth difference is not smaller than the second threshold.

The target portion selection unit 15 can select the target portions by applying not only the above-described selection logic but also arbitrary selection logic. For example, the target portion selection unit 15 can not only set a pair of first threshold and second threshold to a fixed value but also set it dynamically in accordance with the position difference and the depth difference. The target portion selection unit 15 may select the target portion based on an evaluation value output in accordance with a function using the position difference and depth difference as parameters. More specifically, the target portion selection unit 15 selects the representative position of the characteristic portion as the target portion if the evaluation value is smaller than a predetermined threshold (to be referred to as the "third threshold" hereinafter) and selects the user instructed position as the target portion if the evaluation value is equal to or larger than the third threshold. In this case, if the position difference and the depth difference are small, it is desirable to set a function that also makes the evaluation value smaller in accordance with this. The above-described third threshold corresponds to a case in which the first threshold and the second threshold are set dynamically in accordance with the position difference and the depth difference.

The target portion selection unit 15 may receive imaging information set in the imaging unit from the imaging unit. The target portion selection unit 15 calculates a depth of field based on the received imaging information. It is therefore desirable that, for example, a focal length and F value of a lens when the image data input to the image data input unit 11 is captured are used as the imaging information. The target portion selection unit 15 may determine the second threshold dynamically based on the depth of field set in the imaging unit. That is, the target portion selection unit 15 sets, to the second threshold, a value which is almost the same as the depth of field. By thus setting the second threshold, a case in which the depth difference is smaller than the second threshold corresponds to a case in which the representative position of the characteristic portion and the user instructed position are in a position relationship that brings them into focus simultaneously. In the case in which the representative position of the characteristic portion and the user instructed position are in the position relationship that brings them into focus simultaneously as described above, the target portion selection unit 15 may set, as the attention position of a target portion, a middle point between the user instructed position and the representative position of the characteristic portion. In this case, the region of the target portion may include the user instructed position and the region of the characteristic portion.

Upon receiving information on a plurality of position differences and a plurality of depth differences, if a characteristic portion exists in which the position differences are smaller than the first threshold, and the depth differences are smaller than the second threshold, the target portion selection unit 15 extracts the characteristic portion. Note that if the target portion selection unit 15 extracts one characteristic portion, it selects the representative position of the characteristic portion as a target portion, and if a plurality of characteristic portions exist, it selects, as a target portion, the representative position of a characteristic portion having the smallest position difference and depth difference. If the target portion selection unit 15 uses an evaluation value based on the position difference and the depth difference, it may select, as a target portion, the representative position of a characteristic portion in which the evaluation value becomes optimum. Note that the characteristic portion in which the evaluation value becomes optimum has the position difference and depth difference that are both small.

If a plurality of characteristic portions exist each in which the position difference is smaller than the first threshold, and the depth difference is smaller than the second threshold, the target portion selection unit 15 may select a plurality of target portions that set the respective representative positions of the characteristic portions as attention positions. In this case, the region of each target portion may include the representative position of each characteristic portion and may further include the region of each characteristic portion. The target portion selection unit 15 may further select target portions each setting the user instructed position as an attention position if a plurality of characteristic portions exist each in which the position difference is smaller than the first threshold, and the depth difference is smaller than the second threshold. In this case, the region of each target portion may include the user instructed position and the representative position of each characteristic portion, and may further include the representative position of each characteristic portion.

Figure 9:
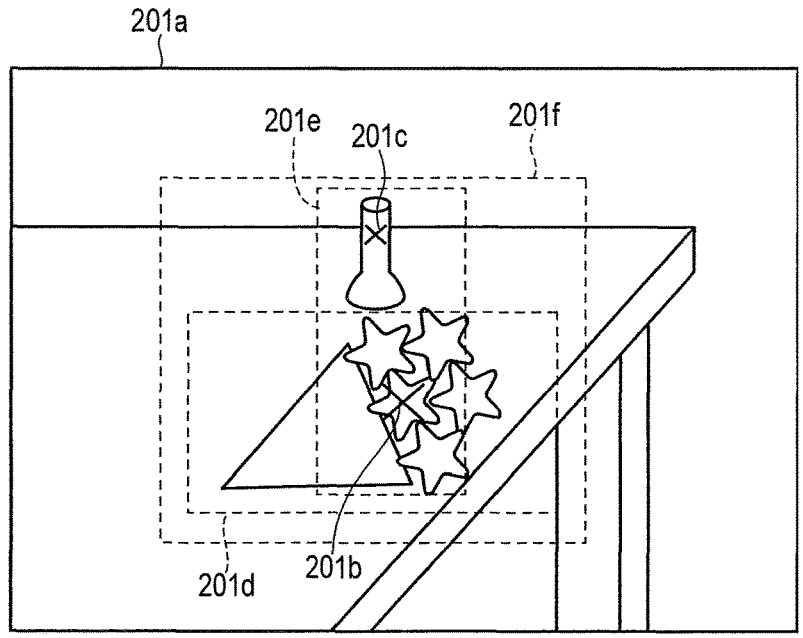
FIG. 9 is a schematic view showing an example of image data according to the second embodiment.

An example of the concrete operation of the arithmetic device according to the second embodiment as described above will now be described with reference to a flowchart shown in FIG. 8. First, an operation will be described in which image data 201*a* as shown in FIG. 9 is input. Note that the target portion selection unit 15 selects a user instructed position 201*c* as a target portion.

In step ST210, the image data input unit 11 accepts the input of the image data 201*a* and transmits it to the characteristic portion detection unit 12. Note that the image data 201*a* has a composition in which a bunch of flowers is arranged at the front, and a small object is arranged at the back when viewed from the imaging apparatus.

In step ST220, the characteristic portion detection unit 12 detects the representative position of a characteristic portion for the image data 201*a*. The characteristic portion detection unit 12 detects the center of the bunch of flowers as a representative position 201*b* of the characteristic portion for the image data 201*a*. The characteristic portion detection unit 12 transmits information on the detected representative position 201*b* of the characteristic portion to a position difference calculation unit 14, the target portion selection unit 15, and the distance information acquisition unit 16.

In step ST230, the user instructed position acquisition unit 13 acquires, as the user instructed position 201*c*, the position of the small object in the image data 201*a*. The user instructed position acquisition unit 13 transmits the acquired user instructed position 201*c* to the position difference calculation unit 14, the target portion selection unit 15, and the distance information acquisition unit 16.

In step ST240, the position difference calculation unit 14 calculates a position difference between the received user instructed position 201c and representative position 201b of the characteristic portion, and transmits it to the target portion selection unit 15.

In step ST250, the distance information acquisition unit 16 acquires the first distance information that indicates a distance between the imaging apparatus and the bunch of flowers corresponding to the representative position 201b of the characteristic portion, and the second distance information that indicates a distance between the imaging apparatus and the small objects corresponding to the user instructed position 201c. The distance information acquisition unit 16 transmits the acquired distance information to the depth difference calculation unit 17.

In step ST260, the depth difference calculation unit 17 calculates a depth difference between the user instructed position 201c and the representative position 201b of the characteristic portion based on the received first distance information and second distance information, and transmits it to the target portion selection unit 15.

In step ST270, the target portion selection unit 15 selects a target portion based on the position difference and the depth difference. More specifically, the target portion selection unit 15 determines whether the position difference is smaller than the first threshold, and the depth difference is smaller than the second threshold. If the target portion selection unit 15 determines that the position difference is smaller than the first threshold, and the depth difference is smaller than the second threshold, it selects the representative position of the characteristic portion as a target portion. If the target portion selection unit 15 determines that the position difference is not smaller than the first threshold, or the depth difference is not smaller than the second threshold, it selects the user instructed position as a target portion. In the example of FIG. 9, a position difference between the representative position 201b of the bunch of flowers and the user instructed position 201c indicating the position of the small object is smaller than the first threshold. However, the depth difference as a difference between a distance from the imaging unit to the bunch of flowers and a distance from the imaging unit to the small object is equal to or larger than the second threshold. Therefore, the target portion selection unit 15 ultimately selects, as a target portion, the position of the small object indicated by the user instructed position 201c.

The target portion selection unit 15 may determine the second threshold based on the depth of field set in the imaging unit. In the example of FIG. 9, if a depth of field when the image data 201a is captured is shallower than a depth difference between the bunch of flowers and the small object, the target portion selection unit 15 selects, as the second threshold, a value smaller than the depth difference. Therefore, the depth difference becomes equal to or larger than the second threshold, and the target portion selection unit 15 selects, as the target portion, the small object indicated by the user instructed position 201c as in the above-described example.

On the other hand, if the depth of field when the image data 201a is captured is deeper than the depth difference between the bunch of flowers and the small object, the target portion selection unit 15 sets, as the second threshold, a value larger than the depth difference. At this time, the depth difference becomes smaller than the second threshold, and the target portion selection unit 15 selects, as the target portions, both the representative position 201b of the bunch of flowers and the user instructed position 201c indicating the position of the small object. Note that in this case, both the bunch of flowers and small object are in an in-focus state. The target portion selection unit 15 may set, as the region of a target portion, a region 201e that includes the user instructed position 201c indicating the position of the small object and the representative position 201b of the bunch of flowers. The target portion selection unit 15 may also set, as the region of a target portion, a region 201f that includes the user instructed position 201c indicating the position of the small object and a region 201d of the bunch of flowers.

Figure 10:
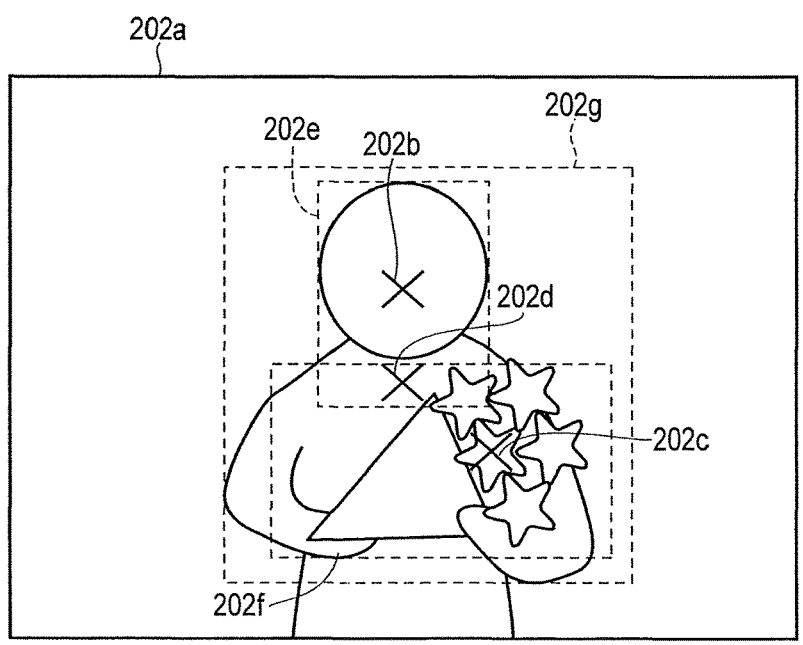
FIG. 10 is a schematic view showing an example of image data according to the second embodiment.

An operation in which image data 202a as shown in FIG. 10 is input, and a plurality of characteristic portions are detected will now be described in the same manner as the above-described example. Note that the image data 202a has a composition in which a bunch of flowers is arranged at the front, and a person is arranged at the back when viewed from the imaging apparatus. The characteristic portion detection unit 12 detects, as characteristic portions, a representative position 202b of a person's face and a representative position 202c of the bunch of flowers. The user instructed position acquisition unit 13 acquires, as a user instructed position 202d, a position having almost the same position difference from the representative position 202b of the face as the center of a person's body and the representative position 202c of the bunch of flowers.

In the example of FIG. 10, a position difference at the representative position 202b of the face is smaller than the first threshold, and a depth difference is smaller than the second threshold. On the other hand, while a position difference at the representative position 202c of the bunch of flowers is smaller than the first threshold, a depth difference is equal to or larger than the second threshold. Therefore, the target portion selection unit 15 ultimately selects the representative position 202b of the face as a target portion.

The target portion selection unit 15 may determine the second threshold based on the depth of field set in the imaging apparatus. In the example of FIG. 10, if the depth of field when the image data 202a is captured is deeper than both the depth differences between the user instructed position 202d, and the respective representative positions 202b and 202c, the target portion selection unit 15 sets, as the second threshold, a value larger than each depth difference. In this case, the respective representative positions 202b and 202c, and the user instructed position 202d are all in the in-focus state. At this time, the target portion selection unit 15 selects, as target portions, all the respective representative positions 202b and 202c, and the user instructed position 202d. The target portion selection unit 15 may set, as a region of a target portion, the region 202e that includes the user instructed position 202d indicating the center position of the person and the representative position 202b of the face. The target portion selection unit 15 may set, as the region of a target portion, a region such as a region 202f that includes the user instructed position 202d indicating the center position of the person and the representative position 202c of the bunch of flowers. A region 202e and the region 202f may include the regions of the respective characteristic portions. The target portion selection unit 15 may set, as the region of a target portion, a region 202g that includes the regions of the respective characteristic portions.

As described above, in the second embodiment, the distance information acquisition unit 16 acquires the distance information that indicates the distance between the imaging apparatus and the object corresponding to the representative position of the characteristic portion, and the distance between the imaging apparatus and the object corresponding to the user instructed position. The depth difference calculation unit 17 calculates the depth differences based on the distance information. The target portion selection unit 15 selects each target portion further based on the depth difference in addition to the position difference. The target portion selection unit 15 determines whether the position difference is smaller than the first threshold, and the depth difference is smaller than the second threshold. The target portion selection unit 15 selects the representative position of the characteristic portion as the target portion if it determines that the position difference is smaller than the first threshold, and the depth difference is smaller than the second threshold, and selects the user instructed position as the target portion if it determines that the position difference is not smaller than the first threshold, or the depth difference is not smaller than the second threshold. This makes it possible to make a determination so as not to select, as a target portion, the representative position of an out-of-focus characteristic portion.

For example, setting flowers of characteristic portions at the front as a front blur (bokeh) element, the user instructs the small object at the back as the user instructed position with the intention of photographing the small object. In this case, the small object at the back is arranged near the flowers at the front in order to overlay the tint of the front blur on the small object. Thus, it is often determined that a position difference between the flowers at the front and the small object at the back is smaller than the first threshold. However, the target portion selection unit 15 can select the small object at the back as a target portion by evaluating that a depth difference between the flowers at the front and the small object at the back are equal to or larger than the second threshold. Therefore, the target portion selection unit 15 can select the target portion intended by the user and execute post processing that conforms to the user intention. For example, if trimming is performed as the example of post processing, it is possible to avoid execution of trimming processing that sets the out-of-focus flowers at the front as the target portion.

The target portion selection unit 15 determines the second threshold based on the depth of field set in the imaging apparatus. This allows the target portion selection unit 15 to guarantee that the user instructed position and the representative position of the characteristic portion are in the range of the depth of field if the representative position is selected as the target portion. If the user instructed position and the representative position are in the range of the depth of field, the target portion selection unit 15 can select both the user instructed position and representative position as the target portions. It is therefore possible to select the target portions that further conform to a user intention.

The characteristic portion detection unit 12 detects a plurality of characteristic portions. The target portion selection unit 15 selects a plurality of target portions based on position differences between the user instructed position and the respective representative positions of the plurality of characteristic portions. This allows the target portion selection unit 15 to exclude, from the plurality of characteristic portions, a characteristic portion having a large position difference or depth difference and select, as target portions, a plurality of characteristic portions each having a small position difference and depth difference from the user instructed position. For example, in the case of a group photo or in a case in which gregarious flowers and dishes that cover a whole table are photographed and undergo trimming as post processing, characteristic portions in an in-focus state may be detected in either case. In this case, it is possible to generate, from one image data, a plurality of trimming images having different target portions by selecting all the plurality of characteristic portions as the target portions. This allows the user to acquire an image that matches a user intention from the trimming images in a wide range of variations.

[Third Embodiment]

Figure 11:
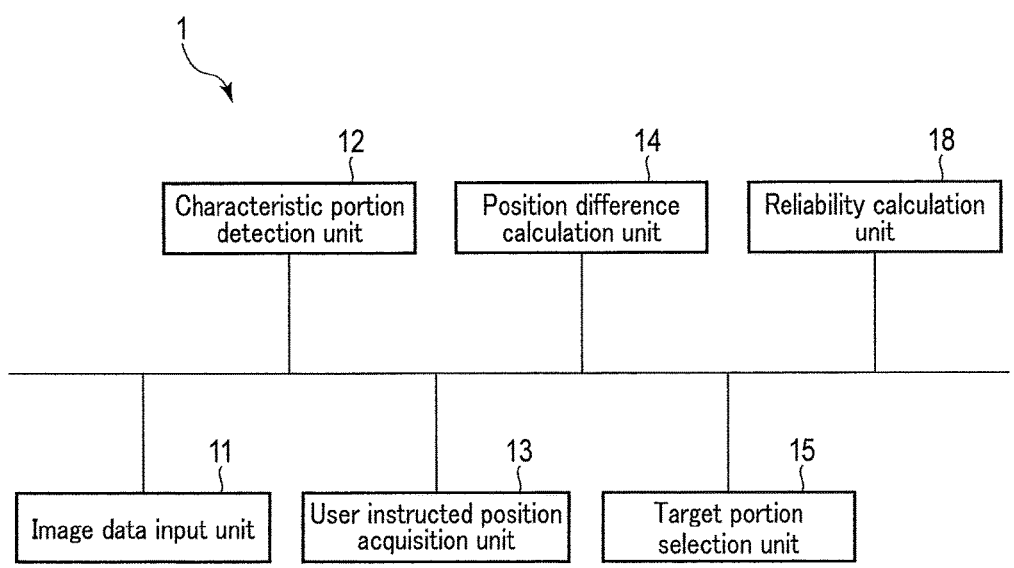
FIG. 11 is a block diagram showing an example of the functional arrangement of an arithmetic device according to a third embodiment of the present invention.

FIG. 11 is a block diagram showing an example of the functional arrangement of an arithmetic device according to the third embodiment of the present invention. As compared with the first embodiment, the third embodiment has an arrangement capable of selecting a target portion more appropriately by considering the reliability of a characteristic portion when a plurality of image data in time series are input. More specifically, an arithmetic device 1 shown in FIG. 11 further includes a reliability calculation unit 18 in addition to the functional arrangement of the arithmetic device 1 according to the first embodiment. The same reference numerals denote the same parts as in FIG. 1, omitting a detailed description thereof and mainly describing different parts below. Note that the third embodiment is applicable not only to the first embodiment but also to the second embodiment.

An image data input unit 11 accepts the inputs of the plurality of image data in time series (to be referred to as "time-series image data" hereinafter). The image data input unit 11 transmits, to a characteristic portion detection unit 12, the time-series image data the inputs of which have been accepted. The input time-series image data may be, for example, a live view image obtained in a predetermined period before photographing by an imaging apparatus.

The image data input unit 11 further accepts the input of image data in which a target portion is selected after accepting the inputs of the time-series image data. The image data input unit 11 transmits the image data to the characteristic portion detection unit 12. Note that the image data in which the target portion is selected may be transmitted to the characteristic portion detection unit 12 together with the time-series image data as the image data of a final frame in the time-series image data.

The characteristic portion detection unit 12 receives the time-series image data from the image data input unit 11 and sequentially makes analyses for calculating characteristic amounts in the time-series image data. Based on the characteristic amount for each image data calculated as a result of the analysis, the characteristic portion detection unit 12 detects the representative position of a characteristic portion for each image data. The characteristic portion detection unit 12 transmits information on the detected representative positions in the time-series image data to the reliability calculation unit 18. The characteristic portion detection unit 12 also transmits, to a position difference calculation unit 14 and target portion selection unit 15, information on the representative positions in the image data in which the target portion is selected.

When the characteristic portion detection unit 12 detects the regions of the characteristic portions, it also transmits information on the regions of the characteristic portions in the time-series image data to the reliability calculation unit 18. The characteristic portion detection unit 12 also transmits, to the target portion selection unit 15, information on the regions of the characteristic portions in the image data in which the target portion is selected.

A user instructed position acquisition unit 13 acquires a user instructed position in the image data based on operation information input by a user operation. Based on the input operation information, the user instructed position acquisition unit 13 acquires, as the user instructed position, the coordinates of the touched portion on the image data. The user instructed position acquisition unit 13 transmits information on the acquired user instructed position to the characteristic portion detection unit 12, position difference calculation unit 14, and target portion selection unit 15. Note that the user instructed position acquired by the user instructed position acquisition unit 13 is acquired for the image data in which the target portion is selected.

The reliability calculation unit 18 receives, from the characteristic portion detection unit 12, information on the representative positions of the characteristic portions in the time-series image data. The reliability calculation unit 18 analyzes, on the time series, the moving amount of the representative position of each characteristic portion in the time-series data and calculates the change amount of the representative position (to be referred to as a "representative position change amount" hereinafter). The reliability calculation unit 18 calculates the reliability of the characteristic portion based on the calculated representative position change amount. The reliability calculation unit 18 transmits the calculated reliability to the target portion selection unit 15. Note that the reliability calculation unit 18 preferably calculates the reliability by using the function of the representative position change amount that increases the reliability if the representative position change amount is small and decreases the reliability if the representative position change amount is large. The reliability may be calculated not only to be a continuous value but also to be a binary expression for a threshold preset for a reliability determination.

The reliability calculation unit 18 may further receive, from the characteristic portion detection unit 12, information on the regions of the characteristic portions in a plurality of image data. In this case, the reliability calculation unit 18 calculates the change amount of each region (to be referred to as a "region change amount" hereinafter) in addition to the representative position change amount, and calculates reliability based on the representative position change amount and region change amount.

The position difference calculation unit 14 receives information on the representative position of a characteristic portion from the characteristic portion detection unit 12 and receives information on a user instructed position from the user instructed position acquisition unit 13, calculating a position difference. The position difference calculation unit 14 transmits information on the calculated position difference to the target portion selection unit 15.

The target portion selection unit 15 further receives the reliability of the detected characteristic portion from the reliability calculation unit 18. The target portion selection unit 15 selects a target portion based on the position difference and reliability. More specifically, the target portion selection unit 15 determines the first threshold based on the reliability. That is, the target portion selection unit 15 sets the first threshold large if the reliability is high and sets the first threshold small if the reliability is low. The target portion selection unit 15 selects the representative position of the characteristic portion as a target portion if the position difference is smaller than the first threshold and selects the user instructed position as a target portion if the position difference is not smaller than the first threshold.

Alternatively, the target portion selection unit 15 may select a target portion based on an evaluation value output in accordance with a function using the position difference and reliability as parameters. More specifically, the target portion selection unit 15 selects the representative position of the characteristic portion as the target portion if the evaluation value is smaller than a predetermined threshold (to be referred to as the "fourth threshold" hereinafter) and selects the user instructed position as the target portion if the evaluation value is equal to or larger than the fourth threshold. In this case, if the position difference is large, and the reliability is low, it is desirable to set a function that also makes the evaluation value larger in accordance with this. If the position difference is small, and the reliability is high, it is desirable to set a function that also makes the evaluation value smaller in accordance with this. The above-described fourth threshold corresponds to a case in which the first threshold is set dynamically in accordance with the position difference and the reliability.

An example of the concrete operation of the arithmetic device according to the third embodiment as described above will now be described with reference to a flowchart shown in FIG. 12. Note that a description below will be given assuming that the target portion is selected for the final frame of the time-series image data.

First, in step ST310, the image data input unit 11 accepts the inputs of the time-series image data and transmits, to the characteristic portion detection unit 12, the time-series image data the inputs of which have been accepted.

In step ST320, the characteristic portion detection unit 12 analyzes each image data of the received time-series image data and detects the representative position of a characteristic portion. The characteristic portion detection unit 12 transmits information on time-series representative positions in the detected time-series image data to the reliability calculation unit 18. The characteristic portion detection unit 12 transmits, to the position difference calculation unit 14 and target portion selection unit 15, information on a representative position in image data in which a target portion is selected. When the characteristic portion detection unit 12 detects a characteristic portion that further contains region information, it transmits information on regions in the time-series image data to the reliability calculation unit 18. The characteristic portion detection unit 12 also transmits, to the target portion selection unit 15, the information on the regions of the characteristic portions in the image data in which the target portion is selected.

In step ST330, the reliability calculation unit 18 receives the information on the representative positions in the time-series image data and calculates the representative position change amount. The reliability calculation unit 18 calculates the reliability of the characteristic portion based on the calculated representative position change amount. The reliability calculation unit 18 also calculates the region change amount in addition to the representative position change amount if the information on the regions of the characteristic portions in the time-series image data is further received. The reliability calculation unit 18 calculates the reliability based on the calculated representative position change amount and region change amount. The reliability calculation unit 18 transmits the calculated reliability to the target portion selection unit 15.

In step ST340, the user instructed position acquisition unit 13 determines whether operation information from the user is input and performs step ST350 if the operation information is input. The image data input unit 11, the characteristic portion detection unit 12, and the reliability calculation unit 18 repeat steps ST310 to ST330 until the operation information is input.

In step ST350, the user instructed position acquisition unit 13 acquires, based on the operation information from the user, the user instructed position in the image data in which the target portion is selected. The user instructed position acquisition unit 13 transmits the acquired user instructed position to the position difference calculation unit 14 and target portion selection unit 15.

In step ST360, the position difference calculation unit 14 calculates the position difference based on the received information on the representative position of the characteristic portion and information on the user instructed position. The position difference calculation unit 14 transmits the information on the calculated position difference to the target portion selection unit 15.

In step ST370, the target portion selection unit 15 selects a target portion based on the received position difference and reliability. More specifically, the target portion selection unit 15 determines the first threshold based on the magnitude of the reliability. Alternatively, the target portion selection unit 15 may determine the first threshold further based on the size of the region of the characteristic portion before selecting the target portion if the information on the region of the characteristic portion is further received. The target portion selection unit 15 determines whether the position difference is smaller than the first threshold. The target portion selection unit 15 selects the representative position of the characteristic portion as a target portion if it determines that the position difference is smaller than the first threshold and selects the user instructed position as a target portion if it determines that the position difference is not smaller than the first threshold.

As described above, in the third embodiment, the image data input unit 11 accepts the inputs of the time-series image data. The characteristic portion detection unit 12 detects the characteristic portion from each of the input time-series image data. The reliability calculation unit 18 calculates the reliability of each characteristic portion based on a time-series change in representative position of the characteristic portion. The target portion selection unit 15 selects the target portion based on the reliability and position difference. Consequently, the reliability of a moving characteristic portion is calculated low, and the first threshold for a position difference between the user instructed position and the representative position of the moving characteristic portion is set small. It is therefore possible to appropriately select a target portion that further conforms to a user intention.

For example, a user instructs a building in a well-trafficked location as a user instructed position with the intention of photographing the building. In such a situation, the face of a passerby detected as a characteristic portion may approach the building instructed as the user instructed position when a target portion is selected. However, since the face of the passerby as the characteristic portion is moving, the reliability calculation unit 18 calculates low reliability for the passerby's face. Accordingly, the target portion selection unit 15 sets the first threshold small for the passerby's face. Therefore, the target portion selection unit 15 can select the building as the target portion by evaluating that a position difference between the building and the passerby's face is equal to or larger than the first threshold. If trimming is performed as an example of post processing, trimming processing that sets the building as the target portion is executed as post processing intended by the user.

[Fourth Embodiment]

Figure 13:
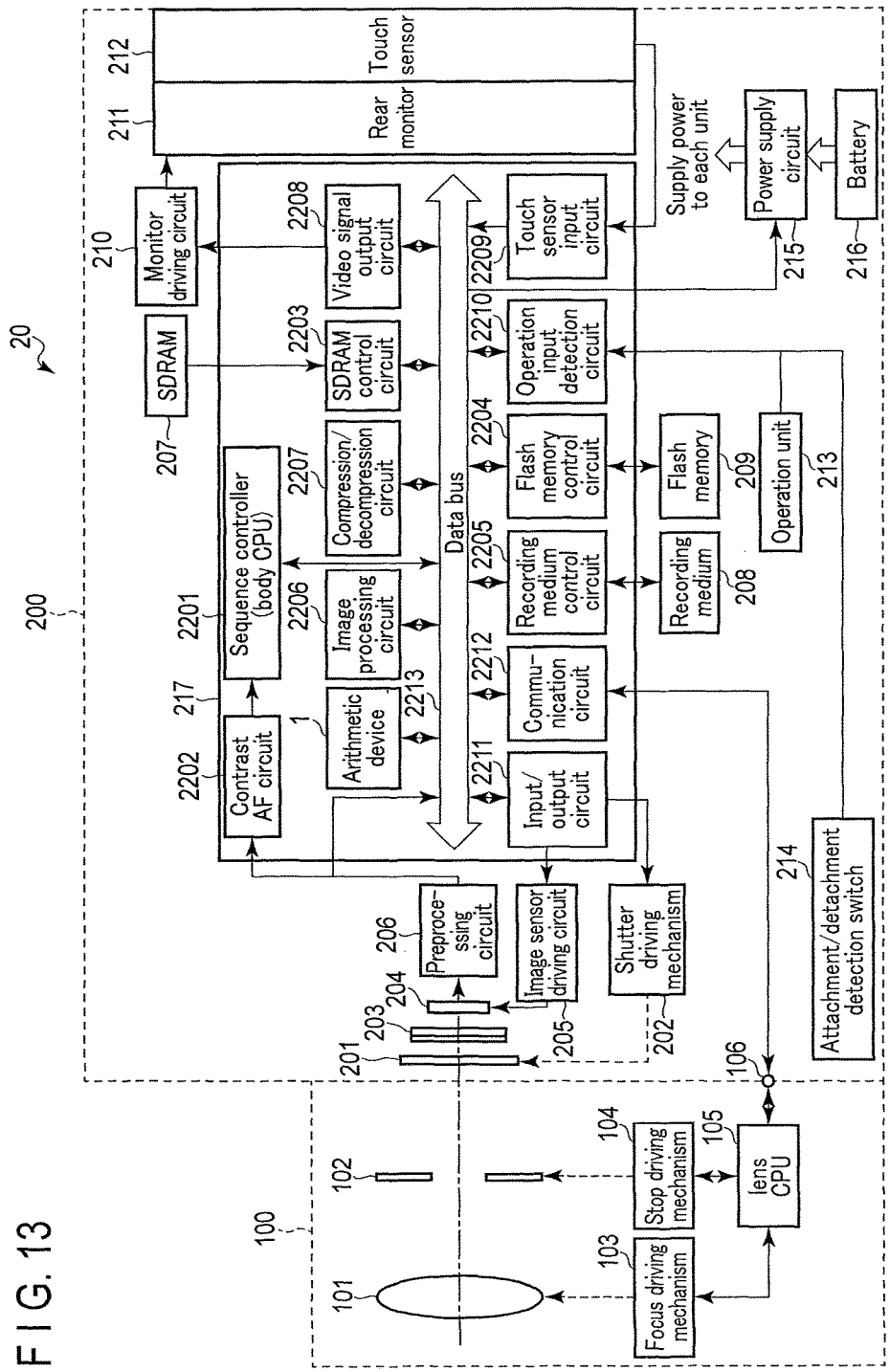
FIG. 13 is a block diagram showing an example of the functional arrangement of an imaging apparatus according to a fourth embodiment of the present invention.

The fourth embodiment of the present invention is related to a digital camera (to be referred to as a camera hereinafter) that includes the arithmetic device 1 of one of the first to third embodiments. The same reference numerals denote the same parts as in FIG. 1, omitting a detailed description thereof and mainly describing different parts below. FIG. 13 is a block diagram showing the functional arrangement of a camera as an example of an imaging apparatus according to the fourth embodiment of the present invention. A camera 20 shown in FIG. 13 exemplifies a camera with interchangeable lenses. However, a technique of the fourth embodiment to be described below is not applied only to the camera with interchangeable lenses.

The camera 20 shown in FIG. 13 includes an interchangeable lens 100 and a camera body 200. The interchangeable lens 100 is detachably arranged in the camera body 200 via a lens mount (not shown) provided in the camera body 200. The interchangeable lens 100 and the camera body 200 are connected communicably by attaching the interchangeable lens 100 to the camera body 200.

The interchangeable lens 100 includes a photographing lens 101, a stop mechanism 102, a focus driving mechanism 103, a stop driving mechanism 104, and a lens CPU (Central Processing Unit) 105. The photographing lens 101 is an optical system configured to form the image of light from an object (not shown) in an image sensor 204 inside the camera body 200. The photographing lens 101 includes a focus lens. The focus lens is driven in an optical axis direction indicated by an alternate long and short dashed line of FIG. 13 to adjust the focus of the photographing lens 101. The stop mechanism 102 adjusts the amount of light from the object that enters the image sensor 204 via the photographing lens 101.

The focus driving mechanism 103 includes a motor and the like, and drives the focus lens in the optical axis direction under the control of the lens CPU 105. The stop driving mechanism 104 includes a motor and the like, and drives the stop mechanism 102 to be opened and closed under the control of the lens CPU 105. The lens CPU 105 is communicably connected to a sequence controller (body CPU) 2201 in the camera body 200 via a communication terminal 106 when the interchangeable lens 100 is attached to the camera body 200. In accordance with control from the body CPU 2201, lens CPU 105 controls the operations of the focus driving mechanism 103 and stop driving mechanism 104, and adjusts a parameter such as a depth of field.

The camera body 200 includes a focal plane shutter (shutter) 201, a shutter driving mechanism 202, a filter group 203, the image sensor 204, an image sensor driving circuit 205, a preprocessing circuit 206, an SDRAM (Synchronous Dynamic Random Access Memory) 207, a recording medium 208, a flash memory 209, a monitor driving circuit 210, a rear monitor 211, a touch sensor 212, an operation unit 213, an attachment/detachment detection switch 214, a power supply circuit 215, a battery 216, and a control circuit 217.

The shutter 201 is arranged to be movable forward and backward with respect to the photoelectric conversion surface of the image sensor 204. This shutter 201 is driven by the shutter driving mechanism 202 to set the photoelectric conversion surface of the image sensor 204 in an exposure state or light-shielding state. The shutter driving mechanism 202 drives the shutter 201 to be opened/closed in accordance with the control of the body CPU 2201. The exposure time of the image sensor 204 is adjusted by thus driving the shutter 201.

The filter group 203 includes a plurality of filters such as an infrared cut filter that removes the infrared component of light entering via the photographing lens 101 and a low-pass filter that removes the high frequency component of light entering via the photographing lens 101.

The image sensor 204 has the photoelectric conversion surface on which a plurality of pixels are arranged and converts, into an electrical signal (image signal), the light from the object whose image has been formed on the photoelectric conversion surface via the photographing lens 101. In accordance with an instruction from the body CPU 2201 via an input/output circuit 2211, the image sensor driving circuit 205 controls driving of the image sensor 204 and readout of the image signal obtained by the image sensor 204. The preprocessing circuit 206 performs preprocessing, for example, analog processing such as noise removal or amplification on the image signal read out from the image sensor 204 via the image sensor driving circuit 205 and a process of converting the image signal that has undergone analog processing into a digital signal (image data).

As described above, the interchangeable lens 100, the shutter 201, the shutter driving mechanism 202, the filter group 203, the image sensor 204, the image sensor driving circuit 205, and the preprocessing circuit 206 also function as imaging unit. That is, the imaging unit has a function of outputting image data obtained by imaging to an arithmetic device 1 in the control circuit 217.

The SDRAM 207 is a buffer memory configured to temporarily store data and the like obtained in the preprocessing circuit 206. The recording medium 208 is, for example, a memory card detachably arranged in the camera body 200 and records image data compressed in a compression/decompression circuit 2207. The flash memory 209 is a memory that stores control programs read out by the body CPU 2201, various setting values of the camera body 200, and the like.

In accordance with a video signal input from a video signal output circuit 2208, the monitor driving circuit 210 drives the rear monitor 211 to display an image on the screen of the rear monitor 211.

The rear monitor 211 is arranged so as to be exposed to the rear of the camera body 200. The rear monitor 211 is driven by the monitor driving circuit 210 to display various images such as an image decompressed by the compression/decompression circuit 2207. The rear monitor 211 in this embodiment also displays a screen for acquiring a user instructed position. The user instructed position is acquired as a candidate for a target portion selected when various kinds of post processing are executed. Examples of post processing include AF, AE, white balance correction, trimming, the addition of a special effect, and the like. The touch sensor 212 is provided integrally with the rear monitor 211 and detects contact of a user finger as operation information from a user. Note that touch sensors of various types such as a resistance film type and a capacitance type can be used as the touch sensor 212. The touch sensor 212 acquires the user instructed position based on the operation information.

The operation unit 213 includes various operation units such as a power switch, a shutter button, a setting button, and an operation dial. The power switch is an operation unit for the user to instruct to turn on/off the camera body 200. The shutter button is an operation unit for the user to instruct to perform photographing. The setting button is an operation unit group for the user to instruct user instructed positions according to various kinds of post processing or the like. The operation dial is a dial operation unit. This operation dial is also used to perform parameter settings according to various kinds of post processing or the like. Note that the functions of the setting button and operation dial may be assigned to the touch sensor 212.

As described above, each of the rear monitor 211 and touch sensor 212 or operation unit 213 may also function as a part of the user instructed position acquisition unit 13. The user instructed position acquisition unit 13 has a function of acquiring the user instructed position in image data and outputting it to the arithmetic device 1 in the control circuit 217. For example, if AF is executed as post processing, the rear monitor 211 displays a screen on which a live view is displayed. The touch sensor 212 outputs, to the arithmetic device 1, a coordinate touched by the user or a coordinate obtained by performing a moving operation on the coordinate as the user instructed position of an AF point.

Note that the user instructed position acquisition unit 13 may acquire the operation information not only by a method of acquiring the operation information by the above-described arrangement but also by adopting various arrangements. For example, when the user performs photographing while shifting a photographing direction after performing focus lock at a certain position, the user instructed position acquisition unit 13 may acquire the user instructed position in consideration of the shift amount of the AF point. The user instructed position acquisition unit 13 may calculate the shift amount by searching for a local image that has undergone focus lock from a shifted image. Alternatively, the user instructed position acquisition unit 13 may calculate the shift amount by a sensor (not shown) such as an acceleration sensor or a gyro sensor. The user instructed position acquisition unit 13 may acquire, as a user instructed position, the center of a region displayed under magnification in order to confirm an in-focus state by an MF (Manual Focus), or the center or barycenter of an in-focus region specified by a focus peaking function. In either case, the user instructed position acquisition unit 13 has a function of acquiring the user instructed position in the image data and transmitting it to the arithmetic device 1 in the control circuit 217.

The attachment/detachment detection switch 214 is a switch which is turned on when the interchangeable lens 100 is attached to the camera body 200 and by being turned on, outputs, to an operation input detection circuit 2210, a signal indicating that the interchangeable lens 100 is attached to the camera body 200.

The power supply circuit 215 converts the voltage of the battery 216 into a voltage needed by each block of the camera body 200. Then, the power supply circuit 215 supplies the converted voltage of the battery 216 to each block of the camera body 200. The battery 216 is, for example, the secondary battery and functions as the power of the camera body 200.

The control circuit 217 controls the various operations of the camera body 200. This control circuit 217 includes the sequence controller (body CPU) 2201, a contrast AF circuit 2202, an SDRAM control circuit 2203, a flash memory control circuit 2204, a recording medium control circuit 2205, an image processing circuit 2206, the compression/decompression circuit 2207, the video signal output circuit 2208, a touch sensor input circuit 2209, the operation input detection circuit 2210, the input/output circuit 2211, a communication circuit 2212, a data bus 2213, and the arithmetic device 1.

The body CPU 2201 generally controls the operation of each circuit in the control circuit 217. The body CPU 2201 in this embodiment also has a function as a control unit and performs the sequence control of the various kinds of post processing in accordance with information on a target portion output from the arithmetic device 1. Note that the sequence control of post processing such as AF and AE includes the control of the operations of the imaging unit. The sequence control of post processing, for example, image processing such as trimming and white balance correction, and the addition of the special effect includes the control of the operation of the image processing circuit 2206.

The contrast AF circuit 2202 calculates an evaluation value for evaluating the contrast of images from the image data obtained via the image sensor 204. The body CPU 2201 performs the AF control of a focus lens in accordance with this evaluation value and the information on the target portion output from the arithmetic device 1. Note that the calculated evaluation value contains distance information indicating a distance between each imaging unit and the object based on a lens driving amount. The body CPU 2201 may transmit the distance information to the arithmetic device 1.

As described above, each of the contrast AF circuit 2202 and the body CPU 2201 also functions as a part of a distance information acquisition unit 16 that acquires the distance information indicating the distance between each imaging unit and the object. Note that the distance information acquisition unit 16 may acquire the distance information not only by a method of acquiring the distance information in the course of contrast AF by the above-described arrangement but also by adopting various arrangements. For example, if the distance information acquisition unit 16 has an image plane phase difference AF function, it is also reasonable to acquire, as distance information, a distance value calculated from a phase difference pixel near the representative position of a characteristic portion or user instructed position. Distance information acquired if the distance information acquisition unit 16 has the image plane phase difference AF function may be obtained by averaging distance values calculated from a plurality of neighboring phase difference pixels while using, as a weight, a difference in position from the position of each of the phase difference pixels to the representative position or user instructed position. In either case, the distance information acquisition unit 16 has the function of acquiring the distance information indicating the distance between each imaging unit and the object, and transmitting the distance information to the arithmetic device 1. The distance information acquisition unit 16 may have a function of outputting, to the each unit in the arithmetic device 1, information on the depth of field of image data captured by each imaging unit.

The SDRAM control circuit 2203 controls data write and readout to/from the SDRAM 207. The flash memory control circuit 2204 controls data write and readout to/from the flash memory 209. The recording medium control circuit 2205 controls data write and readout to/from the recording medium 208.

The image processing circuit 2206 performs various kinds of image processing on image data obtained in the preprocessing circuit 206 and stored in the SDRAM 207. The image processing includes post processing such as white balance correction processing for correcting the color balance of an image, color correction processing for collecting colors of an image, and tone correction processing for correcting the tone of an image. The image processing circuit 2206 receives information on a target portion in image data selected by the arithmetic device 1 before starting the various kinds of image processing. The image processing circuit 2206 executes the image processing based on the target portion. The image data that has undergone the image processing by the image processing circuit 2206 is stored in the SDRAM 207 again. The compression/decompression circuit 2207 reads out the image data after the image processing and compresses the readout image data by a predetermined compression format such as the JPEG compression format. At the time of image reproduction, the compression/decompression circuit 2207 also reads out the compressed image data and decompresses the readout image data.

The video signal output circuit 2208 reads out image data from the SDRAM 207, converts the read out image data into a video signal, and outputs it to the monitor driving circuit 210. The touch sensor input circuit 2209 that functions as an input detection unit with the touch sensor 212 analyzes, from a signal from the touch sensor 212, the touch position and movement of a user finger on the touch sensor 212, and outputs an analysis result to the body CPU 2201.

The operation input detection circuit 2210 detects the operation state of each operation unit of the operation unit 213 and notifies the body CPU 2201 of a detection result. When the operation of each operation unit is detected via the operation input detection circuit 2210, the body CPU 2201 performs control according to the operation contents of the operated operation unit.

The input/output circuit 2211 is an interface circuit configured to output, from the control circuit 217, signals for performing the control of the image sensor driving circuit 205 and shutter driving mechanism 202. The communication circuit 2212 performs various processes for performing communication between the body CPU 2201 of the camera body 200 and the lens CPU 105 of the interchangeable lens 100. The data bus 2213 is a transfer path for transferring various data such as image data obtained in the preprocessing circuit 206 and image data processed in the image processing circuit 2206.

The arithmetic device 1 accepts the inputs of image data photographed by the imaging unit and the user instructed position acquired by the part of the user instructed position acquisition unit 13. The arithmetic device 1 may accept the input of distance information acquired by the part of the distance information acquisition unit 16. The arithmetic device 1 sequentially performs, on the input image data, arithmetic processing described in the first to third embodiments. After executing the arithmetic processing, the arithmetic device 1 transmits, to the body CPU 2201, the information on the target portion selected in the image data in order to use it for various kinds of post processing. Image data where the various kinds of post processing executed and controlled by the body CPU 2201 are reflected is displayed on the rear monitor 211 and presented to the user.

As described above, in the fourth embodiment, the imaging unit outputs the image data obtained by imaging. The user instructed position acquisition unit 13 acquires the user instructed position in the image data. As described in the first to third embodiments, the arithmetic device 1 selects the target portions. This makes it possible to select the target portions intended by the user appropriately and execute post processing intended by the user. The rear monitor 211 presents, to the user, an image that has undergone the post processing intended by the user. This makes it possible to provide an image that has undergone the various kinds of post processing without impairing a sense of use of the user.

The present invention has been described above based on the respective embodiments. However, the present invention is not limited to the respective embodiments described above, and various modifications and applications are possible within the scope of the present invention. That is, the technique of the fourth embodiment may be applied to, for example, a camera without any lens change as a camera of a portable terminal such as a smartphone. The technique of the fourth embodiment is also applicable to an imaging apparatus in a form in which the imaging unit and the control circuit 217, and the user instructed position acquisition unit 13 are separated from each other structurally, or the imaging unit, and the control circuit 217 and the user instructed position acquisition unit 13 are separated from each other structurally, and communicate with each other wirelessly.

The method of each process, that is, the process shown in each flowchart by the arithmetic device in each embodiment described above can also be stored as a program executable by the control circuit 217. In addition to this, it can be stored in and distributed to an external storage device such as a memory card (a ROM card, a RAM card, or the like), a magnetic disk (a floppy® disk, a hard disk, or the like), an optical disk (such as a CD-ROM, a DVD, or the like), or a semiconductor memory. Note that the external storage device may be referred to as a non-transitory computer-readable storage medium. Then, the control circuit 217 can execute the above-described processing by loading the program stored in a storage medium of this external storage device and controlling an operation with this loaded program.

Note that the control circuit 217 may include a specific circuit (specific processor) configured by one or more circuits, for example, GPU (Graphical processing unit), ASIC (Application specific integrated circuit), and FPGA (Field programmable gate array). Then, the control circuit 217 can realize the functions of image data input unit 11, characteristic portion detection unit 12, user instructed position acquisition unit 13, position difference calculation unit 14, target portion selection unit 15, distance information acquisition unit 16, depth difference calculation unit 17, and reliability calculation unit 18 of the arithmetic device 1 by the specific processor.

In the explanation of each operation flowchart described above, the operation has been described by using "first", "then", and the like for the sake of convenience. However, this does not mean that it is essential to execute the operation in this order.

Further, it is possible to form various inventions by combining, as needed, a plurality of constituent elements disclosed in the respective embodiments described above. For example, some constituent elements may be deleted from all the constituent elements described in the respective embodiments. Furthermore, the constituent elements throughout the different embodiments may be combined as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An arithmetic method comprising:
   accepting an input of image data;
   detecting a representative position of a characteristic portion from the image data, the input of which has been accepted;
   acquiring a user instructed position in the image data;
   calculating a position difference indicating a difference between the detected representative position and the acquired user instructed position;
   acquiring first distance information indicating a distance between an imaging unit that acquires the image data and an object corresponding to the representative position of the characteristic portion, and second distance information indicating a distance between the imaging unit and an object corresponding to the user instructed position;
   calculating a depth difference indicating a difference between the distance indicated by the first distance information and the distance indicated by the second distance information; and
   selecting the representative position of the characteristic portion as a target portion if the calculated position difference is smaller than a predetermined first threshold and the depth difference is smaller than a predetermined second threshold, and selecting the user instructed position as a target portion if the position difference is not smaller than the predetermined first threshold or the depth difference is not smaller than the predetermined second threshold,
   wherein the predetermined second threshold is determined based on a depth of field set in the imaging unit.

2. The arithmetic method of claim 1, further comprising detecting a region of the characteristic portion, wherein the predetermined first threshold is determined based on a size of the region of the characteristic portion.

3. The arithmetic method of claim 1, wherein the detecting the representative position includes detecting respective representative positions of a plurality of characteristic portions, and the selecting the target portion includes selecting a plurality of target portions based on each of position differences between the detected respective representative positions of the plurality of characteristic portions and the acquired user instructed position.

4. The arithmetic method of claim 1, wherein the accepting the input of the image data includes accepting inputs of time-series image data, the detecting the representative position includes detecting a representative position from each of the input time-series image data, the arithmetic method further comprises calculating reliability of the representative position based on a time-series change in the detected representative position, and the selecting the target portion includes selecting the target portion based on the calculated reliability, and a position difference indicating a difference between each of the detected representative position from each of the input time-series image data and the acquired user instructed position.

5. The arithmetic method of claim 1, wherein the detecting the representative position of the characteristic portion is performed by detecting a coordinate that represents the characteristic portion.

6. A non-transitory computer-readable storage medium storing a program which causes an arithmetic device to:
   accept an input of image data;
   detect a representative position of a characteristic portion from the image data, the input of which has been accepted;
   acquire a user instructed position in the image data;
   calculate a position difference indicating a difference between the acquired user instructed position and the detected representative position of the characteristic portion;
   acquire first distance information indicating a distance between an imaging unit that acquires the image data and an object corresponding to the representative position of the characteristic portion, and second distance information indicating a distance between the imaging unit and an object corresponding to the user instructed position;

calculate a depth difference indicating a difference between the distance indicated by the first distance information and the distance indicated by the second distance information; and select the representative position of the characteristic portion as a target portion if the calculated position difference is smaller than a predetermined first threshold and the depth difference is smaller than a predetermined second threshold, and select the user instructed position as a target portion if the position difference is not smaller than the predetermined first threshold or the depth difference is not smaller than the predetermined second threshold, wherein the predetermined second threshold is determined based on a depth of field set in the imaging unit.

7. An imaging apparatus comprising:

one or more hardware processors comprising:

an imaging unit that outputs image data obtained by imaging;

a characteristic portion detection unit that detects a representative position of a characteristic portion from the image data;

a user instructed position acquisition unit that acquires a user instructed position in the image data;

a position difference calculation unit that calculates a position difference indicating a difference between the acquired user instructed position and the detected representative position of the characteristic portion;

a distance information acquisition unit that acquires first distance information indicating a distance between the imaging unit and an object corresponding to the representative position of the characteristic portion, and second distance information indicating a distance between the imaging unit and an object corresponding to the user instructed position;

a depth difference calculation unit that calculates a depth difference indicating a difference between the distance indicated by the first distance information and the distance indicated by the second distance information; and a target portion selection unit that selects the representative position of the characteristic portion as a target portion if the calculated position difference is smaller than a predetermined first threshold and the depth difference is smaller than a predetermined second threshold, and selects the user instructed position as a target portion if the position difference is not smaller than the predetermined first threshold or the depth difference is not smaller than the predetermined second threshold, wherein the predetermined second threshold is determined based on a depth of field set in the imaging unit.

* * * * *